(12) United States Patent
Döhring (10) Patent No.: US 10,774,532 B2
(45) Date of Patent: *Sep. 15, 2020

(54) DIRECTLY PRINTED PANEL HAVING A TWO-LAYER DESIGN

(71) Applicant: Xylo Technologies AG, Niederteufen (CH)

(72) Inventor: Dieter Döhring, Grossenhain (DE)

(73) Assignee: Xylo Technologies AG, Neiderfeufen (CH)

( * ) Notice: Subject to any disclaimer, the term of this patent is extended or adjusted under 35 U.S.C. 154(b) by 3 days.

This patent is subject to a terminal disclaimer.

(21) Appl. No.: 16/238,089

(22) Filed: Jan. 2, 2019

(65) Prior Publication Data

US 2019/0136529 A1 May 9, 2019

Related U.S. Application Data

(62) Division of application No. 14/900,231, filed as application No. PCT/EP2013/062905 on Jun. 20, 2013, now Pat. No. 10,202,768.

(51) Int. Cl.

| B32B 3/10 | (2006.01) |
|---|---|
| E04C 2/30 | (2006.01) |
| B05D 7/00 | (2006.01) |
| E04F 15/10 | (2006.01) |
| B32B 7/02 | (2019.01) |
| B32B 21/02 | (2006.01) |

(Continued)

(52) U.S. Cl.
CPC ............... *E04C 2/30* (2013.01); *B05D 3/067* (2013.01); *B05D 7/586* (2013.01); *B32B 7/02* (2013.01); *B32B 21/02* (2013.01); *B32B 21/08* (2013.01); *B32B 27/308* (2013.01); *B44C 1/00* (2013.01); *E04C 2/20* (2013.01); *E04C 2/46* (2013.01); *E04C 2/50* (2013.01); *E04F 13/0889* (2013.01); *E04F 13/16* (2013.01); *E04F 15/02038* (2013.01); *E04F 15/102* (2013.01); *E04F 15/107* (2013.01); *B05D 5/06* (2013.01); *B05D 7/06* (2013.01)

(58) Field of Classification Search
None
See application file for complete search history.

(56) References Cited

U.S. PATENT DOCUMENTS

| 2006/0018698 A1 | 1/2006 | Vogt |
| 2009/0041987 A1 | 2/2009 | Schitter |

(Continued)

FOREIGN PATENT DOCUMENTS

| DE | 10 2006 029 963 A1 | 1/2008 |
| DE | 10 2006 058 655 A1 | 6/2008 |

(Continued)

OTHER PUBLICATIONS

International Search Report for corresponding patent application No. PCT/EP2013/062905 dated Feb. 18, 2014.

(Continued)

*Primary Examiner* — Christopher M Polley
(74) *Attorney, Agent, or Firm* — Renner, Otto, Boisselle & Sklar, LLP (57) ABSTRACT

A panel and a method for manufacturing of such a panel with a carrier plate, comprising a front side and a back side, and wherein the carrier plate comprises a layer system at least at the front side that is built from various polymer layers with different hardness values.

21 Claims, 2 Drawing Sheets

(51) Int. Cl.
*B32B 21/08* (2006.01)
*B32B 27/30* (2006.01)
*B05D 3/06* (2006.01)
*B44C 1/00* (2006.01)
*E04C 2/20* (2006.01)
*E04B 2/00* (2006.01)
*E04B 5/02* (2006.01)
*E04F 13/08* (2006.01)
*E04F 13/16* (2006.01)
*E04F 15/02* (2006.01)
*B05D 5/06* (2006.01)
*B05D 7/06* (2006.01)

(56) References Cited

U.S. PATENT DOCUMENTS

2010/0098963 A1 4/2010 Döhring et al.
2011/0138722 A1 6/2011 Hannig
2011/0146177 A1 6/2011 Hannig
2015/0064421 A1 3/2015 Döhring
2016/0037034 A1 2/2016 Inasaki et al.

FOREIGN PATENT DOCUMENTS

| EP | 1938963 A1 | 7/2008 |
| JP | 2012-215064 A | 11/2012 |
| JP | 2013-83139 A | 5/2013 |
| RU | 2392402 | 6/2010 |
| RU | 2465415 | 10/2012 |
| RU | 2483177 | 5/2013 |
| WO | 2007/042258 A1 | 4/2007 |
| WO | 2008 061765 A1 | 5/2008 |
| WO | 2008 061791 A1 | 5/2008 |
| WO | 2013 149644 A1 | 10/2013 |

OTHER PUBLICATIONS

Office Action for corresponding Russian Patent Application No. 2015156135/05(086543) dated Apr. 25, 2017.
Search Report for corresponding Russian Patent Application No. 2015156135/05(086543) dated Apr. 20, 2017.

DIRECTLY PRINTED PANEL HAVING A TWO-LAYER DESIGN

This application is a divisional of U.S. patent application Ser. No. 14/900,231 filed Dec. 21, 2015, which is a National Phase of International Application No. PCT/EP2013/062905 filed Jun. 20, 2013, which are both hereby incorporated herein by reference in their entirety.

1. FIELD OF THE INVENTION

The present invention relates to a panel, particularly to a wall, ceiling, or floor panel with an improved surface primer as well as a method for manufacturing it.

2. BACKGROUND OF THE INVENTION

A plurality of panels for wall, ceiling, and/or floor coatings are known from the prior art. For example, so-called laminate panels are widely spread as floor coating in the inner area. Laminate panels are relatively cheap and can be well processed. Commonly, they are based on a carrier plate made of MDF or HDF material, on which a decor paper, impregnated with melamine resin, is applied to its upper side. By grouting under influence of heat and pressure, the resins cure, such that a highly abrasion-resistant surface is formed. To increase abrasion resistance, the surface is often provided with abrasion resistant particles, in particular corundum, prior to grouting.

As an alternative to laminate panels, for some time past, high-quality panels based on PVC are known and are distributed as LVT (luxury vinyl tiles). For example, a floor panel in the form of multi-layered, rectangular laminate with a carrier plate consisting of soft polyvinylchloride (PVC) is known from DE 10 2006 058 655 A1. Onto the soft PVC layer, or plate respectively, a decor paper web is glued on, such that the visible surface of the PVC is applied with a decor. As an alternative to such decor paper webs, applied to a PVC carrier plate, also the usage of plastic foils is known, which are also, for example, imprinted with a decorative decor.

From DE 10 2006 029 963 A1, a floor coating made of polyvinylchloride is known, which is coated with a durable lacquer layer, to improve durability of the PVC floor coating. The lacquer layer is based on an acrylate resin and is cured by means of radiation. The core of this document relies in adding of electrical conductive substances to the resin, for proving the finished floor coating with antistatic and/or electrical conductive properties.

More recently, LVT panels prevailed on the market that have a harder PVC plate with a thickness of 4-6 mm as a ground and on which a soft PVC layer is applied, comprising the features as described above. Specific profiles are milled into the harder plate as coupling means. In such a way, the single panels can easily be laid to form a plane area.

In a further development of the above described panels, so-called direct imprinted panels have been developed. Commonly, for these direct imprinted panels no more papers of foils are used, in particular no decor paper. The decor layer is rather directly imprinted onto the surface of the carrier plate, to which commonly a suitable pretreatment is applied, by utilizing dispersion colors by means of an intaglio printing process. In particular, before printing, a primer is applied by means of roller application. After drying of the decor layer, various resin layers are applied and cured. The resin layers thereby serve as a protective layer as well as abrasion resistant surface. To further improve abrasion resistance, often abrasion resistant particles, like corundum, are provided, too.

From WO 2007/042258, for example, a method for direct coating of wood materials is known, in which a thick protective layer made of plastic material is applied liquidly onto the surface of a plate within one coating step. The used plastic material is a liquid, polymerizable acrylate system that is cured by polymerization.

The mentioned prior art panels each have several pros and cons, depending from their structure, from the used manufacturing process, and from the used materials. For example, laminate panels can easily be laid, provide the opportunity to realize high-quality decors, and, additionally, are very durable. However, typically, the acoustic properties of laminate panels are disadvantageous, which produce annoying running noise when used as a floor coating. Responsible for that is the very hard melamine layer on the laminate surface. In addition, this melamine layer is felt as cold and unpleasant. Coatings based on PVC have excellent acoustic properties and, additionally, have a pleasant haptic and feel relatively soft and warm, which is desirable in many cases, e.g. when used as a floor coating in a bathroom. However, for producing optical high-quality surfaces, such PVC floorings have to be processed in a relative costly manner, and are therefore significantly more expensive compared to common laminate panels, at least when they should provide comparable quality. A disadvantage of PVC panels is that deep scratches can easily arise on the soft surface when intensively used, which disturb the optical image. Furthermore, it is disadvantageous that PVC floorings are not harmless from the ecological point of view. They comprise harmful plasticizers and chlorine is known as very dangerous in case of fire (e.g. chlorine dioxin development).

Direct imprinted panels remove some of the disadvantages of laminate panels and, e.g., need no decor paper soaked with melamine resin, whereby the manufacturing may be simplified. However, compared to laminate panels, they have similar disadvantages with regard to acoustic properties and haptic.

In light of these known panels, or respectively coatings, the objective of the present invention is to provide a panel, particularly a wall panel, a ceiling panel, or a floor panel, comprising as much as possible of the different advantages of the known panels, but at the same time, however, minimizing the existing disadvantages of the various panels. In addition, the further objective is to manufacture such a panel in a cheap and relatively simple manner. A further objective is providing such panels that have a good durability and which allow to realize high-quality decorative patterns.

This and other objectives, which will be mentioned in the present description or that will become apparent for the skilled person, are achieved by a panel according to claim 1 and with a respective manufacturing method of such a panel according to claim 24.

3. DETAILED DESCRIPTION OF THE INVENTION

According to the present invention, a panel, like a wall, ceiling, but particularly a floor panel is provided that comprises a carrier plate with a front side and a back side, wherein at least a layer system is applied at the front side. The front side shall be understood as the side which is the used side that points to the observer, when the panel is laid, e.g., in form of a floor. The carrier plates can optionally be divided into panels. At their side edges, the panels can provide coupling means, particularly in form of tongue and groove elements, as known from the area of floor laminate panels. Particularly suited tongue and groove elements allow connecting various similar panels in parallel direction to the front side and also perpendicular to the front side by form fitting. Of course, the process sequence can be applied to the panels one by one, wherein this approach is less economical. The layer system, according to the invention, originating of the front side, comprises a first elastic layer made of a polymer and which is called layer S1 in the following. This first polymer layer according to the invention having a thickness of 20-600 μm and a Martens hardness $M_{S1}$ of 0.5-120 N/mm², preferably between 2 and 50 N/mm², more preferably between 2 and 40 N/mm², and most preferably between 2 and 30 N/mm², and it is soft elastic. Above this first elastic layer, a second layer S2 is provided that has a thickness of only 10-200 μm and a Martens hardness $M_{S2}$ which is greater than the Martens hardness of the first elastic layer, i.e. $M_{S2}>MS_1$. The Martens hardness $M_{S2}$, determined at the panel surface, is between 5-300 N/mm², preferably at 15-150 N/mm², more preferably between 20 and 100 N/mm², and most preferably between 25 and 90 N/mm².

The structure of the layer system of the panel according to the invention implicates that the surface of a coated panel in such a way—independent from the material of the carrier plate—feels relatively soft and has for human feelings a comfortable warm haptic impression. In particular, providing a thick elastic layer S1 has significant acoustic advantages. Compared to a laminate reference floor, the layer system according to the invention leads to a significant noise damping effect when walked on. According to IHD-W 431, a loudness of 26 Sone is determined for a laminate reference floor. The floor, provided with an elastic layer S1 and a layer S2 comprises an improvement of 10-70% compared to this reference floor. A PVC (LBT) floor was measured with an improvement of 40% compared to the reference.

A plurality of different materials is possible as materials for the carrier plate since the relevant physical properties of the panel according to the invention are substantially determined by the applied layer system. Thus, generally, the carrier plate of the panel according to the invention is preferred with a MDF plate, an HDF plate, a PVC plate, a cement fiber plate, a WPC plate (wood powder composite), a thermoplastic recycling plate, a wood plate, a wood veneer plate, or a parquet plate like a pre-fabricated parquet plate. As mentioned at the beginning, the carrier plate may comprise coupling means in form of tongue and groove elements at its sides, such that the panels according to the invention can, for example, be easily laid to form a covering on a floor.

In general, materials for the layers S1 and S2 (and S3) are preferably based on acrylate systems or based on acrylates, respectively. An acrylate system is herein to be understood as a polymerizable mixture of mono-, bi- and multi-functional acryl acid based compounds comprising double bonds. Typical representatives are, for example, dipropylenglycoldiacrylate, 1,6-hexandioldiacrylate, polyurethane acrylate acid ester, polyester-acrylate acid ester as available on the market according to the production program of the company BASF under the trademark Laromer™ types.

Layer S1 is preferably a polymer based on a radical polymerizable oligomer and/or oligomer mixture. Preferably, it is based on radiation hardenable acrylate oligomers (acrylate system). The oligomers are chosen such that the layer provides damping properties, characterized in that the Martens hardness is preferably 0.5-120 N/mm², more preferably 2-50 N/mm². Such an oligomer formulation consists, for example, of one or more unsaturated acrylates that comprise a polyester, polyether and/or a polyurethane structure, with a functionality of 1-4, preferably <2. Commercially available examples are the Laromer PO 43 F, the Laromer UA 9033 or the Laromer UA 19 T of BASF. Additionally, the oligomer mixture may comprise low viscose acrylate ester with a functionality of 1-4, preferably with a functionality of 1-2. Commercially available examples are the Laromer LR 8887, Laromer DPGDA, Laromer TPGDA of BASF. For hardening by means of UV-radiation, photo initiators like mono- or bi-sacylphosphinoxide, alphahydroxycetone, benzophenon derivate, benzildimethycetal or phenylglyoxalate are needed. In addition, the formulation can comprise additives like wetting agents, defoamers, inorganic or organic filling materials. As additives, for example, poly acrylate, silicones, talcum, barium sulfate, chalk, silicic acid or polyuria derivates may be used.

The material of the second layer S2 is preferably based on a radical polymerizable acrylate oligomer (acrylate system) or a radical polymerizable acrylate mixture, consisting of one or more unsaturated acrylates (acrylate system), a polyester, polyether and/or polyurethane structure with a functionality of 1-8, preferably 3-6. Examples are the Laromer PE 9074, Laromer 8863 or Laromer LR 8987 as raw lacquer materials of BASF. Preferably, these acrylate mixtures further comprise low viscose acrylate ester with a functionality of 1-6, preferably with a functionality of 2-4. For example, following raw materials of BASF with the trademark name Laromer HDDA, Laromer TMPTA, Laromer PPTTA can be used. In case of UV-linked systems, photo initiators as for example mono or bisecylphosphinoxide, alphahydroxycetone, benzophenon derivate, benzildimethylcetal or phenylglyoxylate are applied. Furthermore, additives like wetting agents, defoamers, matting agents and inorganic or organic filling materials may be applied, like poly acrylate, silicones, talcum, barium sulfate, chalk, silicic acid or polyuria derivates. The oligomers are chosen such that the surface hardness lies in the above-mentioned ranges. Furthermore, the raw material selection is made such that the layer S2 has, besides damping properties, in particular, a high abrasion resistance (scratch resistance, micro scratch resistance, abrasion resistance). The skilled person knows that these properties are achieved by network density and modifications, for example, with nano particles.

Preferably, the thickness of the carrier plate is between 3 and 20 mm, more preferably between 4 and 15 mm and even more preferably between 3 and 12 mm, and most preferably between 4 and 10 mm. Depending on the usage and the applied decor (if available), different shapes are possible. If, for example, the panel shall imitate a real wood decor and be laid as a floor panel or wall panel, a square base form of the carrier plate or the panel is advantageous, e.g. in a square shape of 1.5-2 m in length and 10-30 cm in width.

As mentioned at the beginning, the relevant physical properties of the surface of the panels according to the invention are substantially determined by the layer system according to the invention. The thick first elastic layer S1 is decisive for the acoustic properties of the panels. Basically, preferred hardness values according to Martens for the layer S1 are between, as mentioned above, 0.5-120 N/mm², more preferably between 2-50 N/mm², even more preferably between 2-40 N/mm² and most preferably between 2-30 N/mm². In every case, the second layer S2 must have a greater hardness compared to the first layer and should be, as mentioned above, in a range between 5-300 N/mm², more preferably at 15-150 N/mm² and more preferably between 20-100 N/mm² and most preferably between 25-90 N/mm². The skilled person knows that even if the mentioned ranges for the preferred hardness of $M_{S1}$ and $M_{S2}$ partially overlap, it is substantially in the focus that $M_{S2}$ is greater than $M_{S1}$.

Determining the Martens hardness is known by the skilled person. During development of the present invention a Taber Abraser measurement device 5151 of Taber Industries was used. Every 200 rounds with an abrasive paper S41 the hardness and the track depth was determined of the probes. Determination of the Martens hardness (registered hardness control under test force influence) was conducted according to DIN EN ISO 14577. As a measurement device, a "Fischerscope H100" of the Helmut Fischer GmbH was used. Following test parameters have been used: maximum force: 50/30 mN and measurement duration: 20 seconds. The determination of the track depth has been conducted with a mechanical touch cut measurement device. As a measurement device a perthometer S3P of the company Perthen was used.

During surveying the probes, it has been shown that probably due to the relatively soft used materials more or less large deviations in the hardness of a given layer depth occur. Thus, it is necessary to measure at various points to achieve meaningful representative data by calculating average values. During the conducted measurements, the hardness and the track depth have been each measured at four locations, after 200 rounds of the abrasive paper. It appears, in most cases that four measurement points provide sufficient accuracy. Of course, even more precise measurement results will be achieved when more than four measurement points are used, e.g. eight.

Preferably, the thickness of the elastic layer S1 is in range of 20-600 μm, more preferably of 40-500 μm, even more preferably of 80-450 μm, and most preferably of 120-240 μm. The second layer S2 has, independently of the thickness of the first layer, preferably a thickness of 10-180 μm, more preferably of 20-100 μm and most preferably of 30-80 μm. Thereby, it is apparent for the skilled person, the thicker the first elastic layer S1 is chosen, the more elastic the properties of the surface of such coated panels are. The layer S1 is preferably applied one after another in part steps, particularly by means of various roller devices with respective gelling after the roller application devices. Gelling is understood that in the respective layer a radical polymerization is initiated by radiation, e.g. by means of UV, but this polymerization is cancelled fast, such that the adhesion of the following layers is ensured. In other words, the part layers are each not completely cured, but only in part. In this way, among other things, also the adhesion of the part layers to each other is increased. The layer S1 can, alternatively, be applied in one single step.

Preferably, a further decor layer is applied between the front side and the layer S1, comprising a printing ink (ink) or consists of this printing ink, respectively. The term "printing ink" is herein used generically and shall not denote a single color, but printing ink in a generic fashion: with regard to digital four-color printing, the printing ink, for example, consists of four different colors (cyan, magenta, yellow, black), of which the printing image is generated by spraying on ink drops. When using indirect intaglio printing, the decor image, as is known, is generated by means of rotating printing cylinders. By means of the printing cylinders, decor specific mixture colors are applied. In principle, with respect to the present invention, it is preferred that the layers S1 and S2 are substantially transparent such that they can serve as protection for an underlying decor layer.

Commonly, dispersion colors are used as printing ink in the prior art, in particular acrylate colors. These dispersion colors are regularly utilized by the commonly used intaglio printing process. Dispersion colors are printing inks that normally consist of three main components, namely a) a dissolver (commonly water), b) a bonding agent in form of plastic polymers that are stored together and form a solid layer when the solvent evaporates, and c) color pigments for generating the desired cover and the desired color tone. The hardening of these dispersion colors is not performed by means of polymerization, but by evaporation of the solvent, since the bonding agents already exist in terms of polymers. The polymers included in the dispersion connect themselves by means of evaporation of the bonding agents in a purely physical manner and form a solid, closed layer.

Surprisingly, it has been found out in connection with the present invention that improved adhesion properties of the layer systems according to the invention can be achieved, when, in the present case, instead of usual dispersion colors, polymerizable printing inks are used. The positive effect is particularly remarkable when the printing ink of the decor layer and at least in part of the first elastic layer S1 are cured or polymerized together, respectively (when the decor layer is directly imprinted, as e.g. with digital printing, the decor layer consists of the printing ink, so to speak). Curing or partially curing (gelling) of a polymer layer or a polymerizable printing ink is to be understood as a chemical reaction in which a polymerization takes place. This has to be distinguished from drying of such layers, wherein only the solvent, like the water content of a dispersion color, evaporates or is reduced in a purely physical manner. By means of the combined (partial) curing of the polymerizable printing ink and the materials for the first elastic layer, probably a chemical linking occurs that the border surface of both layers, of which it is assumed that it is responsible for the improved adhesion of the layers. The commonly used dispersion colors do not comprise polymerizable acrylate systems such that no chemical linking between the printing ink, i.e. the decor layer, and the elastic layer takes place.

Generally, the printing inks used for the present invention are therefore preferably polymerizable printing inks and in particular polymerizable acrylate systems. Polymerizable printing inks comprise as main component bonding agents, namely reactive double bondings containing resins; monomers or oligomers, like acrylate monomers and acrylate oligomers; optionally photo initiators for radiation hardenable printing inks; additives like defoamers, flow additives and the like; and color pigments and filling material for achieving specific physical technical properties. Generally, the used printing inks for the present invention are preferably radiation hardenable, particularly by UV ray hardenable printing inks. More preferably, the printing ink is based on a polymerizable acrylate and/or N-vinylcaprolactam.

In a further embodiment according to the invention, a third elastic layer S3 is provided on the front side beneath the decor layer which has a Martens hardness $M_{S3}$, wherein the hardness of the third elastic layer is preferably equal or less than the hardness of the first elastic layer S1, i.e. $M_{S3} \leq M_{S1}$. In this way, particularly thick layer systems with corresponding good elastic properties may be generated. Preferably, the layer S3 should have a thickness of 10-300 μm, more preferably of 30-150 μm and most preferably of 60-120 μm. For the layer S3, a radical polymerizable acrylate mixture is used, as it is provided for the layer S1 and described above. This oligomer mixture is preferably applied with pigments before application in order to provide the layer with a covering color as printing ground, i.e. that this layer S3 should preferably not be transparent in order to achieve a sufficient printing quality. The decor layer, including possible necessary primers and primary coatings, is then applied onto the before applied layer S3. The advantage of this third layer S3 is that the total layer system can be designed very thick without impacting the optical impression of an eventually present decor layer since only the first elastic layer S1 and the second layer S2 lie between the observer and the decor layer.

The layer system according to the invention has the advantage that no further paper or plastic foils are necessary at the front side of the panel or the carrier plate, as it has been necessary in many applications in the prior art. Therefore, the panels can be applied with a layer while running through a machine and do not have to be stuck together with a before produced paper or plastic foil.

In a further embodiment according to the invention, the decor layer, including the possibly necessary support layers like primers or coating primers can be arranged between layer S1 and the wear layer S2.

In addition, the present invention also relates to a process for manufacturing a panel, particularly a panel as discussed above. In this process, a carrier plate, like a MDF or HDF carrier plate, is provided in a first step. The carrier plate is applied with a layer of liquid radiation hardenable acrylate such that after successfully curing, it provides a Martens value $M_{S1}$ of 0.5-120 N/mm². With common roller application processes normally layer thicknesses of up to 80 µm, and in special cases up to 100 µm can be applied in one working step. In order to achieve the desired layer thicknesses for the first elastic layer S1, it will be commonly necessary to harden each applied layer, preferably by means of radiation in order to apply a further layer on this partly or completely cured layer. Since preferably always the same materials are used, a homogenous elastic—according to the hardness—layer S1 with a thickness of up to 600 µm can be generated. However, for each of the layers of layer S1, different materials with different values for $M_{S1}$ can be used, which, however, should preferably not differ too much from each other and should in every case be in the range according to the invention of 0.5-120 N/mm². Particularly, an as much as possible homogeneous hardness in the final layer S1 (or S2) is preferred, which can most easily be achieved by using the same or at least similar materials. After achieving the desired final thickness of the elastic layer S1, after S1 has been partially or completely cured, a layer with further liquid radiation curable acrylates is applied, wherein this is chosen such that the layer comprises a Martens hardness $M_{S2}$ after curing, which is greater than the Martens hardness of the before applied first elastic layer. Also in this case, it might be necessary to apply various layers with respective connected (part-) curing steps, if particularly large final thickness of the second layer S2 is desired. Although in this case different materials can be used for every layer of the layer S2 with different values for $M_{S2}$, as long as (every) $M_{S1}$ is less than the smallest $M_{S2}$ of the single layers of the layer S2. However, also here it is preferred to use the same or at least similar materials for the partial layers of the layer S2, since this improves the cohesion of the partial layers and may lead to an increased durability of the total layer S2 (respectively S1).

Advantageously, before applying the first elastic layer S1 onto the surface of the carrier plate, a primer is applied and a decor layer is imprinted thereon. Preferably, this is done by direct printing, wherein the above in connection with the panel according to the invention described technical information are also basically usable for the present method. In other words, the decor layer or the decorative pattern is here also preferably applied by means of a polymerizable printing ink and more preferably at least a first layer of the first elastic layer S1 is applied onto the not yet (at least not completely) cured printing ink and then cured together with the printing ink. In this manner, a particularly good connection of the layer system with the surface of the carrier plate is achieved.

EXAMPLE 1

In a first step, an HDF carrier plate with a thickness of 8 mm is applied with a primer based on a commercial watery acrylate dispersion with an application of 10 g/m² by means of a roller application device. In a next step, smoothing of the plate by means of a roller application device by means of a filler based on a highly filled watery acrylate dispersion with an application amount of 25 g/m² is done. Afterwards, a printing ground (primer coating) based on a watery acrylate dispersion enriched with filling materials and color pigments is applied by means of a molding process (i.e. by a curtain coating process) with an amount of 70 g/m². After each of these coating steps, an intermediate drying at a temperature between 80-200° C. is performed. The plates treated in such a way are then applied to a printing machine, substantially consisting of a gravure roller and a rubber roller used for transferring the printing image from the gravure cylinder onto the plate. The printing image is generated by means of three down-streamed printing devices, wherein by means of each of the printing devices an own dispersion printing ink, consisting of color pigments and a watery acrylate dispersion is applied. For an imitation of a dark nut tree wood, for example, 5 g/m² of printing ink are applied. In a further process, a commercial UV primer is applied onto the printing color layer by means of a roller application device. By means of a subsequent roller application device, a radical polymerizable acrylate oligomer mixture (1) is applied in an amount of 80 g/m². This oligomer mixture (1) comprises 70 parts of Laromer PE 9032 and 25 parts of Laromer TBCH of BASF, as well as five parts of further additions (benzildimethylcetal as a photo initiator, an aliphatic urethane acrylate with a functionality of 3). By means of a UV emitter, gelling (partially curing) is performed for this layer. By means of a further roller application device, again the same (or alternatively a similar) oligomer mixture (1) in the amount of 80 g/m² is applied and at least in part cured. Onto the in such a way built first elastic layer S1 a layer S2 with a further double bonding containing, with photo initiators enriched radiation hardenable oligomer (2) in an amount of 50 g/m² is applied by means of a third roller application device and is polymerized by means of UV radiation. This oligomer (2) consists of a mixture of 75 parts of Laromer PE 9074, 20 parts Laromer HDDA of BASF and 5% of further additives (among other things phenylglyoxalate as photo initiator) and has a greater hardness ($M_{S2}$) compared to the first layer S1.

EXAMPLE 2

Panels for Which the Printing Image is Generated by Means of Radiation Hardened Printing Inks Again, it is used an 8 mm thick HDF carrier plate and, according to example 1, it is provided with a watery primer, filler and printing ground. On the plate, treated in such a way, the same decor image according to example 1 is generated by means of a digital printer. However, hereby no dispersion colors are used, but UV radiation hardenable digital printing inks. For generating the printing image, an amount of about 2 g/m² of ink is needed. At first, the ink is fixed with 150 mJ/cm² (mercury) and then, the first layer of layer S1 according to the first example is applied and together with the printing ink cured at least in part (gelled). The further steps are then performed according to example 1.

EXAMPLE 3

An HDF carrier plate undergoes the production steps up to behind the printing machine according to example 1. Onto the dried printing ink, a commercial watery UV primer is applied. By means of the preceding process, the plate is heated up to a surface temperature of 50-60° C., such that water of the primer evaporates fast such that the primer is fixed. Subsequently, an oligomer mixture (1) according to example 1 is applied in an amount of 50 g/m² by means of a roller device and gelled by means of UV radiation. Afterwards, a second roller application of 50 g/m² of that oligomer mixture (1) (or a similar one) with a subsequent gelling and, finally, a third application (1) of 50 g/m² with subsequent gelling in order to form the layer S1. Then, by means of a roller application device, the wear or covering layer (i.e. layer S2) of 30 g/m² is applied and hardened by means of UV radiation. The oligomer (2') for the covering layer S2 consists of a mixture of 75 parts Laromer PE 9074, 20 parts Laromer HDDA of BASF and 5% of further additives (among others, phenylglyoxalat as photo initiator and a matting agent). By means of the amount of the added matting agent, the desired degree of gloss of the surface is controlled. The further processing of the plates into floor panels is preformed according to example 1.

EXAMPLE 4

In a first step, an HDF carrier plate with a thickness of 8 mm is applied with a primer based on a commercial watery acrylate dispersion with an application of 10 g/m² by means of a roller application device. In a next step, smoothing of the plate by means of a roller application device by means of a filler based on a highly filled watery acrylate dispersion with an application amount of 25 g/m² is performed. Subsequently, a UV radiation hardenable mass in an amount of 40 g/m² is applied by means of a roller device. This radiation hardenable mass consists of 65 parts of the oligomer mixture (1) according to example 1 and of 35% finest dispersed titanium dioxide. Subsequently, it is gelled by means of UV radiation. A second application of 40 g/m² of this mass is performed by means of a down-streamed roller application device with subsequent gelling. The resulting layer is in accordance with the above-described layer S3. Afterwards, digital printing according to example 2 is conducted. Furthermore, optionally, a commercial UV primer in an amount of 3 g/m² is applied by means of a roller application device. The further coating with the oligomers (1) and (2) used for generating the layers S1 and S2 is performed according to example 1 and also the manufacturing of the panels of the base plates.

Subsequently, some determined properties of the manufactured floor materials according to the examples 1-4 are presented:

a) Determining the walking noise emission according to IHD-W 431 (version of May 14, 2012)

The characteristic values have been determined with non-compliance of the spectrums with the biggest and smallest noise unit (outlier correction according to IHD-W 431). The result is shown in terms of a difference between the A-rated total sound pressure level and the noise unit of the examined variance compared to the reference floor. The changing of the linear parameter noise unit (N) is determined according to the reference in percent as follows:

Change in percentage:

$((Nref-Nf)*100\%)/Nref$

The determined characteristic value shows the increase (negative value) or decrease (positive value) in percent of the loudness experience. The reference is a common laminate floor with a melamine resin coating and a plate thickness of 8 mm.

TABLE 1

| | A-rated total sound pressure level | | |
|---|---|---|---|
| Version | Reference (mid-range spectrum) [dBA (A)] | Probe (mid-range spectrum) [dBA (A)] | Improvement extent [dBA (A)] |
| Example 1 | 75.3 | 64.8 | 10.5 |
| Example 2 | 75.3 | 65.2 | 10.1 |
| Example 3 | 75.3 | 65.5 | 9.8 |
| Example 4 | 75.3 | 64.3 | 11.0 |
| LVT (PVC) floor (5 mm in thickness) | 75.3 | 64.9 | 10.4 |

The examples show that a significant noise reduction during walking can be achieved by means of the coating according to the invention. A reduction of 10 dB is felt like a halving of the loudness by means of the human hearing. To have a direct comparability, only HDF carrier plates have been used as carrier plates in the examples 1-4. With alternative carrier plates further significant noise reductions are possible.

4. DESCRIPTION OF PREFERRED EMBODIMENTS

In the following, the present invention is explained in more detail with reference to the attached figures. At this.

Figure 1A:
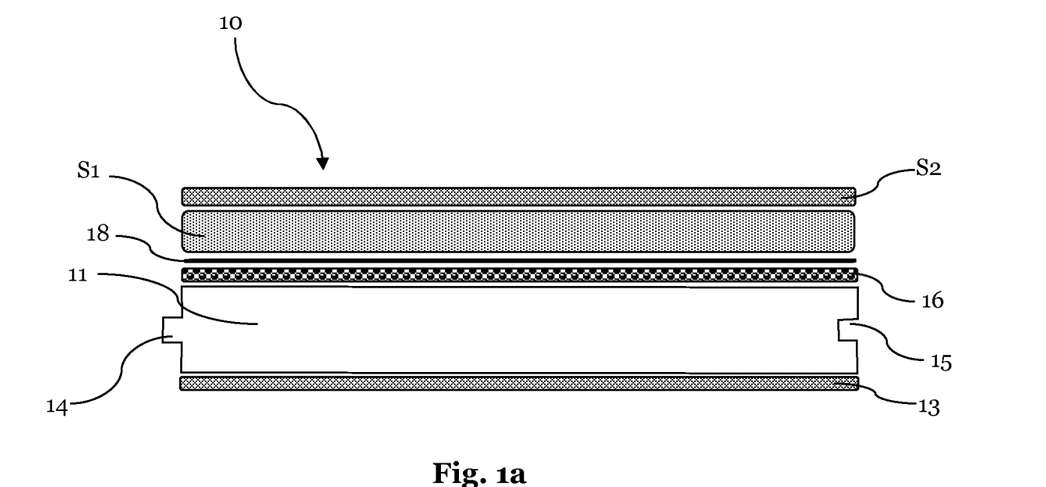
FIGS. 1a and b how an exemplary layer structure of a schematic illustration.
Figure 1B:
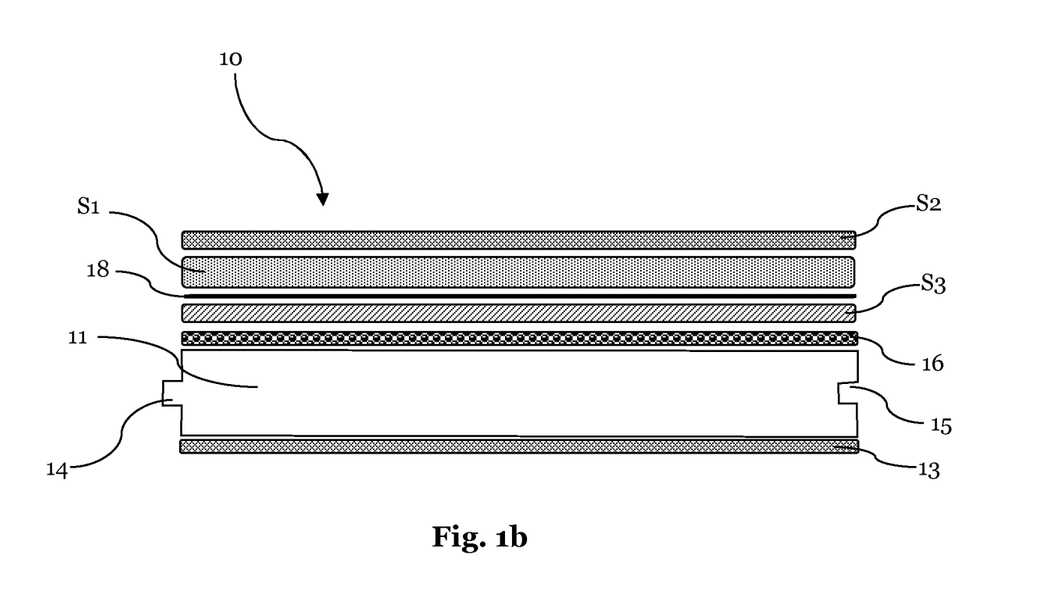

In FIG. 1a, a schematic layer structure of a panel 10 according to the invention is shown. The illustration is purely schematic and not true to scale. In particular, the carrier plate 11 is significantly thicker compared to the further layers 12-18, which lie in a range of some hundred μm. Furthermore, the single layers are shown in an explosion view in order to simplify the understanding and are in a real case directly adjacent to each other or directly arranged above each other. In the shown example, a carrier plate 11 with a thickness of about 8 mm made of an HDF material is shown. At the backside of the carrier plate 11 a moisture barrier 13 in form of an appropriate plastic foil is pasted. The moisture barrier is optional and depending on the material of the carrier plate 11 and the desired usage area. A carrier plate 11 furthermore comprises coupling means in form of tongue 15 and groove elements 14, which are only shown schematically in FIGS. 1a (and b). Suitable coupling means in form of tongue and groove elements that allow connecting various similar panels in parallel direction of the front side and also perpendicular to the front side by means of form fitting are known by the skilled person. Commonly, at the four sides of a square or quadrangle carrier plate opposing complementary coupling means are provided. Details about such coupling means or locking profiles are known by the skilled person from the technology of laminate floor production, as e.g. known from the document WO 0188306 or from the document WO 0148332 of the same applicant, which are hereby entirely incorporated by reference.

In the shown layer system of panel 10, a primer coating 16 with a thickness of, for example, 50-200 µm is provided which is based on a watery acrylate system. Beneath the primer, further very thin primer coatings and/or filler layers may be applied as known by the skilled person from the area of direct imprinted panels. A decor layer or a decor 18 is imprinted onto the primer 16. The decor 18 or the decor layer 18 have been applied, for example, by means of a polymerizable printing ink by a digital four color printing. A first elastic layer 51 is located above the decor layer 18 with a thickness of 200 µm and a Martens hardness $M_{S1}$ of 15 N/mm². A second layer S2 is applied onto the first elastic layer S1, which has a thickness of 80 µm and a Martens hardness of about 25 N/mm².

The example of FIG. 1b corresponds to the example of FIG. 1a with the difference that a further elastic layer S3 is provided between the primer coating 16 and the decor layer 18. The layer S3 has preferably a Martens hardness $M_{S3}$ which is less or equal than the Martens hardness of the layer S1, therefore $M_{S3} \leq M_{S1}$. In the example of FIG. 1b, the first layer S1 may be provided in a slightly thinner way compared to the example of FIG. 1a which is shown in both figures schematically by means of different thicknesses.

Figure 2:
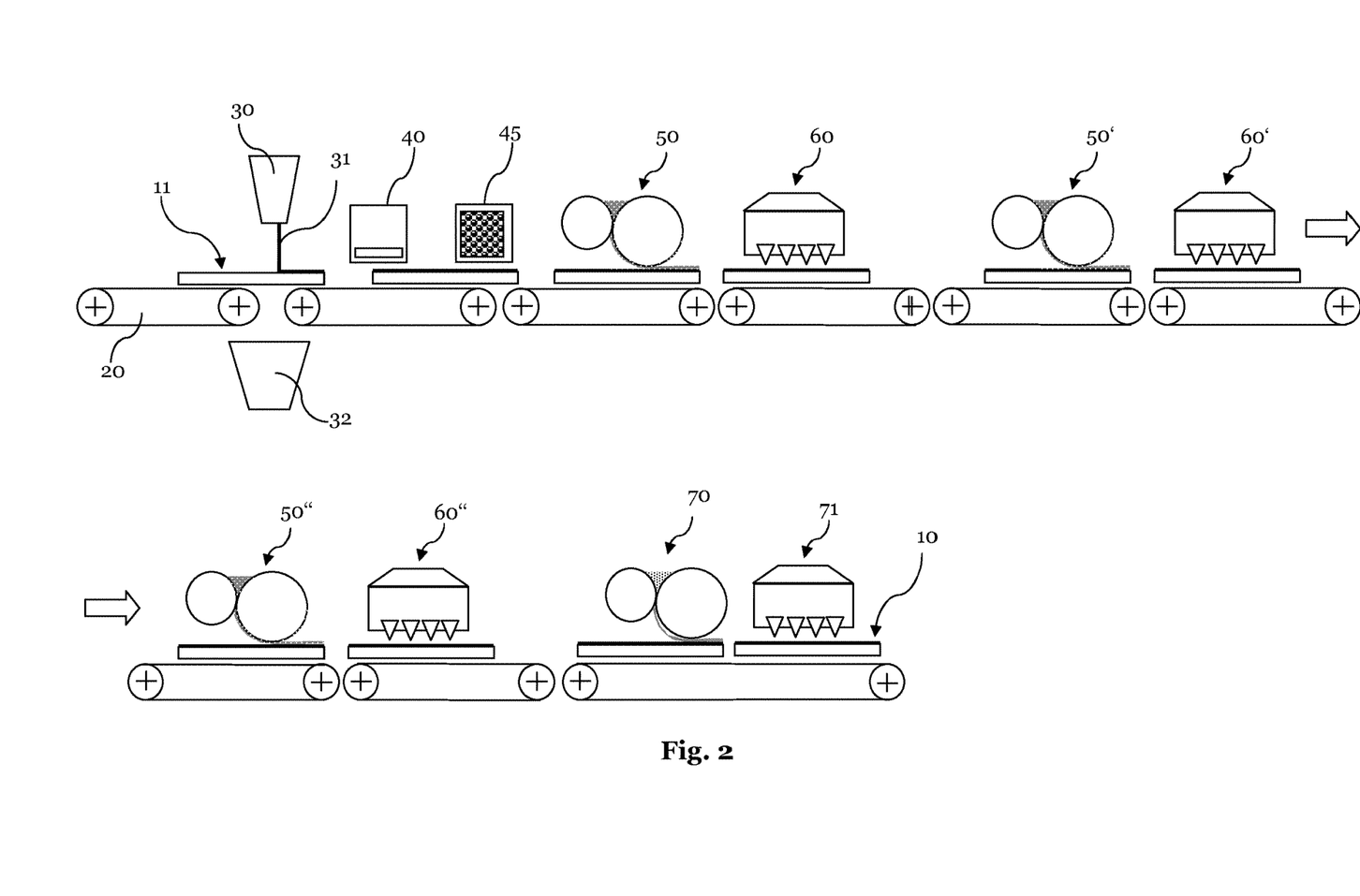
FIG. 2 shows an exemplary system for manufacturing of the panel according to the invention in a schematic view.

In the following, the manufacturing of a panel according to the invention is exemplarily shown in FIG. 2. FIG. 2 shows in a schematic way a coating system for coating carrier plates 11. The carrier plates are trimmed and profiled after the coating in a separate profiling line (not shown). For example, the carrier plates 11 have a thickness between 3-20 mm, a length (in transport direction of the system of FIG. 2) of 150-200 cm and a width of 125-210 cm. However, any other plate dimensions can be used for the carrier plates, which are cut in the desired form and size at the end of the process. The stations shown in FIG. 2 of the system are not to be understood conclusive, but only serve as an example explanation of the methods according to the invention. In front, behind and between the shown stations, further processing stations may be provided, like drying stations, stations for applying primers, stations for applying filler, control and monitor devices etc. The carrier plates 11 are, for example, transported through the coating system by means of roller conveying device 20.

In the first shown station 30, a grounding mass is applied onto the front side (main side) of the carrier plates 11 by means of a liquid curtain 31 of coating material. The liquid curtain 31 ranges among the complete width of the plate and the plates are transported through this curtain and are coated at the same time. Below the device 30 for outputting the curtain, a collection container 32 is located, in which the liquid curtain drops, when no plate is passed through the curtain, as for example, at a gap between two consecutive plates. Preferably, a watery acrylate dispersion is used as a coating material for the grounding. In a subsequently arranged drying station 40, the applied grounding is dried by means of hot air, i.e. water is extracted from the watery acrylate dispersion. After drying the grounding, a decor layer is imprinted onto the grounding by means of a digital printing device 45. This decor layer, for example, can imitate real wood, but nowadays commercial digital printing works are able to nearly print every desired decor or pattern on the plates. Preferably, a printing ink is utilized in printing device 45 that is polymerizable by means of radiation, i.e. a printing ink that is based on a polymerizable acrylate and/or N-vinylcaprolactam. It is apparent for the skilled person that the illustration of the digital printing device 45 is only purely schematic and that such printing devices commonly consist of several stations. After imprinting the desired decor, a first coating device 50 applies a first layer of liquid radiation hardenable aliphatic acrylate. The material is chosen in such a way that it comprises a Martens hardness $M_{S1}$ of 0.5-120 N/mm² after the curing. The device 50 is a roller application device and is able to apply a layer thickness of about 40-100 µm in one process step. In the subsequent station 60, the applied layer of liquid radiation hardenable aliphatic acrylate is cured at least in part by means of UV radiation. Subsequently, a second device 50' follows in order to apply a second layer of the same liquid radiation hardenable acrylate compared to the first layer. Also here, the station 50' is a roller application station which is commonly able to apply layer thicknesses of 30-100 µm. In station 60' this second layer is at least cured in part by UV radiation. Subsequently, in a third coating device 50" a third layer of the same liquid radiation hardenable acrylate is applied and in the third radiation station 60" it is at least in part cured by means of UV radiation. In the schematic view of FIG. 2 three such devices are thus shown, which are able to apply three layers in one layer, but however, also more or less devices may be available, depending on the desired total thickness of the first elastic layer S1. In any case, there is a first elastic layer S1 available at the exit of the last radiation station 60" with a thickness of about 150 µm. Then, onto this first elastic layer S1, a layer of liquid radiation hardenable acrylate is applied in an application station 70 that is chosen in a way such that after the curing it comprises a Martens hardness $M_{S2}$ that is greater than the Martens hardness of the first elastic layer and preferably at 5-300 N/mm². Here, in FIG. 2, as an example, only an application device 70 and a station 71 for radiation hardening is shown, but however, also for the second layer S2 various devices may be provided, depending on the desired final thickness of the layer of S2. Then at the exit of the coating device, a coated panel, according to the invention will be available, that may be further processed as desired.

What is claimed:

1. A panel comprising a carrier plate having a front side and a back side, wherein the carrier plate has a layer system at least at the front side, wherein the layer system, originating of the front side, comprises:
    a first elastic layer S1 made of a polymer, having a thickness of 20 to 600 µm and a Martens hardness $M_{S1}$ of 0.5 to 120 N/mm²;
    a second layer S2 made of a polymer, having a thickness of 10 to 180 µm and a Martens hardness $M_{S2}$, wherein $M_{S2} > M_{S1}$, and
    a decor layer is arranged between the front side and the layer S1, comprising a printing ink, and
    a third elastic layer S3 is arranged between the front side and decor layer, having a Martens hardness $M_{S3}$, wherein $M_{S3} \leq M_{S1}$.

2. The panel according to claim 1, wherein the polymer of the layer S1 is an aliphatic polymer.

3. The panel according to claim 1, wherein $M_{S1}$ is between 2 and 50 N/mm².

4. The panel according to claim 1, wherein $M_{S2}$ is between 50 and 300 N/mm².

5. The panel according to claim 1, wherein the first elastic layer S1 has a thickness of 40 to 500 µm.

6. The panel according to claim 1, wherein the second elastic layer S2 has a thickness of 10 to 180 µm.

7. The panel according to claim 1, wherein the carrier plate comprises coupling means in terms of tongue and groove elements at its sides, enabling coupling of various similar panels in parallel direction to the front side and perpendicular to the front side by form fitting.

8. The panel according to claim 1, wherein the polymer of the layer S1 is based on a radiation hardened aliphatic acrylate.

9. The panel according to claim 1, wherein the layer S3 has a thickness of 10 to 300 µm.

10. The panel according to claim 1, wherein the printing ink is based on a polymerizable acrylate and/or N-vinyl-caprolactam.

11. The panel according to claim 1, wherein the printing ink of the decor layer and at least a part of the layer S1 have been hardened together.

12. The panel according to claim 1, wherein the decor layer has been applied by digital printing.

13. The panel according to claim 1, wherein the polymer of the layer S2 is based on one or more of the following acrylates: 1,6-hexandioldiacrylate, polyester acrylate, polyurethane acryl acid ester or dipropylene glycole diacrylate.

14. The panel according to claim 1, wherein the carrier plate has a thickness between 3 and 20 mm.

15. The panel according to claim 1, wherein the carrier plate is a MDF plate, a HDF plate, a PVC plate, a cement fiber plate, a WPC plate (wood powder composite), a thermoplastic recycling plate, wood plate, a wood veneer plate, or a parquet plate.

16. The panel according to claim 1, wherein no paper or plastic foil is applied to the front side of the panel.

17. The panel according to claim 1, wherein source materials of the layers S1, S2, and S3 are radiation hardenable materials.

18. The panel according to claim 1, wherein the layers S1 and S2 are transparent.

19. The panel according to claim 1, wherein the panel is not provided with abrasion-resistant particles.

20. The panel according to claim 1, wherein the layer system has a damping effect of at least 5 dB compared to the uncoated carrier plate, measured according to EPLF norm.

21. The panel according to claim 1, wherein the hardness of the elastic layer S1 is substantially constant over the total thickness, and in that the hardness differences within the layer are less than 20 N/mm$^2$.

* * * * *

UNITED STATES PATENT AND TRADEMARK OFFICE
CERTIFICATE OF CORRECTION

PATENT NO. : 10,774,532 B2
APPLICATION NO. : 16/238089
DATED : September 15, 2020
INVENTOR(S) : Dieter Doehring

Page 1 of 1

It is certified that error appears in the above-identified patent and that said Letters Patent is hereby corrected as shown below:

On the Title Page

Item (73), "Neiderfeufen (CH)" should read "Niederteufen (CH)"

Signed and Sealed this
Twentieth Day of October, 2020

Andrei Iancu
*Director of the United States Patent and Trademark Office*